United States Patent
Ebara et al.

(10) Patent No.: US 8,175,767 B2
(45) Date of Patent: May 8, 2012

(54) DIAGNOSTIC APPARATUS

(75) Inventors: Tatsuhiko Ebara, Fujisawa (JP); Tomoko Ohta, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 428 days.

(21) Appl. No.: 12/514,874

(22) PCT Filed: Nov. 13, 2007

(86) PCT No.: PCT/JP2007/071978
§ 371 (c)(1),
(2), (4) Date: May 14, 2009

(87) PCT Pub. No.: WO2008/062691
PCT Pub. Date: May 29, 2008

(65) Prior Publication Data
US 2010/0063667 A1    Mar. 11, 2010

(30) Foreign Application Priority Data

Nov. 24, 2006   (JP) ................................. 2006-317597

(51) Int. Cl.
*G01M 17/00* (2006.01)
(52) U.S. Cl. ..................... 701/29.1; 701/29.2; 701/29.4; 701/62
(58) Field of Classification Search .................... 701/29, 701/30, 29.1, 29.2, 29.4, 34.4, 62
See application file for complete search history.

(56) References Cited

U.S. PATENT DOCUMENTS

| | | | | |
|---|---|---|---|---|
| 4,896,569 A | * | 1/1990 | Ito et al. | 477/65 |
| 4,996,893 A | * | 3/1991 | Nakamura et al. | 477/120 |
| 5,088,353 A | * | 2/1992 | Yoshida | 477/92 |
| 5,133,230 A | * | 7/1992 | Ito et al. | 477/154 |
| 7,643,924 B2 | * | 1/2010 | Kawamura et al. | 701/62 |

(Continued)

FOREIGN PATENT DOCUMENTS

JP      H02-180357 A      7/1990

(Continued)

OTHER PUBLICATIONS

International Search Report for PCT/JP2007/071978 dated Dec. 18, 2007.

*Primary Examiner* — David Dunn
*Assistant Examiner* — Philip Gabler
(74) *Attorney, Agent, or Firm* — McCormick, Paulding & Huber LLP

(57) ABSTRACT

A diagnostic apparatus (10) in which a drive circuit (2) is configured of switching means (3) for supplying an electric current to a linear solenoid valve and variably regulating a valve opening degree on the basis of inputted ON-OFF signals, current detection means (4) for detecting an electric current flowing from the switching means (3) to the linear solenoid valve (1), and control means (5) for outputting ON-OFF signals to the switching means (3) on the basis of a detected current value from the current detection means (4) so that the linear solenoid valve has a target opening degree, and which diagnoses a ground short between the drive circuit (2) and the linear solenoid valve (1), the diagnostic apparatus including ground short detection means (5) for detecting a switching of ON-OFF signals inputted in the switching means (3) and determining a ground short fault when the number of ON-OFF switching cycles per a predetermined interval is equal to or less than a predetermined number of cycles.

3 Claims, 3 Drawing Sheets

U.S. PATENT DOCUMENTS

2005/0187681 A1 * 8/2005 Suzuki et al. ................... 701/29

FOREIGN PATENT DOCUMENTS

| JP | H03-199757 A | 8/1991 |
| --- | --- | --- |
| JP | H07-119816 A | 5/1995 |
| JP | 07-194175 A | 7/1995 |
| JP | 2002-231529 A | 8/2002 |
| JP | 2003-166668 A | 6/2003 |
| JP | 2005-236101 A | 9/2005 |
| JP | 2006-152987 A | 6/2006 |

* cited by examiner

DIAGNOSTIC APPARATUS

CROSS REFERENCE TO RELATED APPLICATIONS

This application is entitled to the benefit of and incorporates by reference essential subject matter disclosed in International Patent Application No. PCT/JP2007/071978 filed on Nov. 13, 2007 and Japanese Patent Application No. 2006-317597 filed Nov. 24, 2006.

TECHNICAL FIELD

The present invention relates to a diagnostic apparatus for diagnosing a ground short of a linear solenoid valve and a drive circuit thereof.

BACKGROUND ART

An ON/OFF valve (duty valve) such that it is repeatedly completely opened and completely closed at a high rate to control a fluid pressure by a duty ratio thereof is known as a fluid pressure regulating valve that regulates a fluid pressure supplied to a transmission clutch operated by a fluid pressure.

A drive circuit of such a duty valve is mainly configured by a power source, a transistor provided between the power source and the duty valve, and a CPU that ON-OFF drives the transistor.

The CPU has a voltage monitor terminal connected between the transistor and the duty valve, and a voltage supplied to the duty valve is detected by the voltage monitor terminal.

For example, when a transmission clutch is completely disconnected, the CPU performs the all-time on drive of the transistor so as to close the duty valve completely.

In this case, when no fault occurs e.g. in a wiring connected to the transistor and duty valve, a predetermined voltage is detected by the voltage monitor terminal, but when the wiring is ground short circuited, the voltage detected by the voltage monitor terminal is 0 V although the transistor is ON driven by the CPU.

Accordingly, in the drive circuit of the duty valve, a ground short fault is determined if the detection voltage of the voltage monitor terminal is zero when the transmission clutch is completely disconnected (the CPU performs the all-time ON drive).

In recent years, a linear solenoid valve whose opening degree can be changed continuously has been used instead of the duty valve in order to increase the resolution of fluid pressure of the transmission clutch (see, for example, Japanese Patent Application Laid-open No. H03-199757, Japanese Patent Application Laid-open No. H07-119816 and Japanese Patent Application Laid-open No. H02-180357).

DISCLOSURE OF THE INVENTION

However, the problem is that in a drive circuit of the linear solenoid valve, a ground short cannot be detected from an input of the voltage monitor terminal.

Thus, because the opening degree of the linear solenoid valve is regulated in correspondence with the supplied electric current, the CPU rapidly switches the ON drive and OFF drive of the transistor even when the transmission clutch is completely disconnected.

Therefore, the detection voltage of the voltage monitor terminal is also ON and OFF rapidly switched, and a ground short fault cannot be detected or determined as in the drive circuit of the duty valve.

It has thus been desirable to detect a ground short in a drive circuit of a linear solenoid valve.

Accordingly, it is an object of the present invention to provide a diagnostic apparatus capable of reliably detecting a ground short of a linear solenoid valve and a drive circuit thereof.

In order to attain the above-described object, the present invention provides a diagnostic apparatus in which a drive circuit is configured of switching means for supplying an electric current to a linear solenoid valve and variably regulating a valve opening degree on the basis of inputted ON-OFF signals, current detection means for detecting an electric current flowing from the switching means to the linear solenoid valve, and control means for outputting ON-OFF signals to the switching means on the basis of a detected current value from the current detection means so that the linear solenoid valve has a target opening degree, and which diagnoses a ground short of the drive circuit and the linear solenoid valve, the diagnostic apparatus including ground short detection means for detecting a switching of ON-OFF signals to be inputted in the switching means and determining a ground short fault when the number of ON-OFF switching cycles per a predetermined interval is equal to or less than a predetermined number of cycles.

It is preferred that the linear solenoid valve be a fluid pressure regulating valve for connecting and disconnecting a transmission clutch operated by a fluid pressure, and that the ground short detection means count the number of times the ground short fault is determined and prohibit shifting of a transmission when the counted accumulated number of times is equal to or greater than a predetermined accumulated number of times.

It is preferred that the ground short detection means set the accumulated number of times to 0, when the engine is stopped by an ignition key, and cancel the shifting prohibition of the transmission.

The present invention brings about an excellent effect of enabling reliable detection of a ground short of a linear solenoid valve and a drive circuit thereof.

BEST MODE FOR CARRYING OUT THE INVENTION

One preferred embodiment of the present invention will be described below in greater detail with reference to the appended drawings.

A diagnostic apparatus of the present embodiment diagnoses abnormalities in a linear solenoid valve provided in a transmission clutch and can be applied, for example, to a transmission clutch constituting a power transmission device of a large vehicle.

Figure 3:
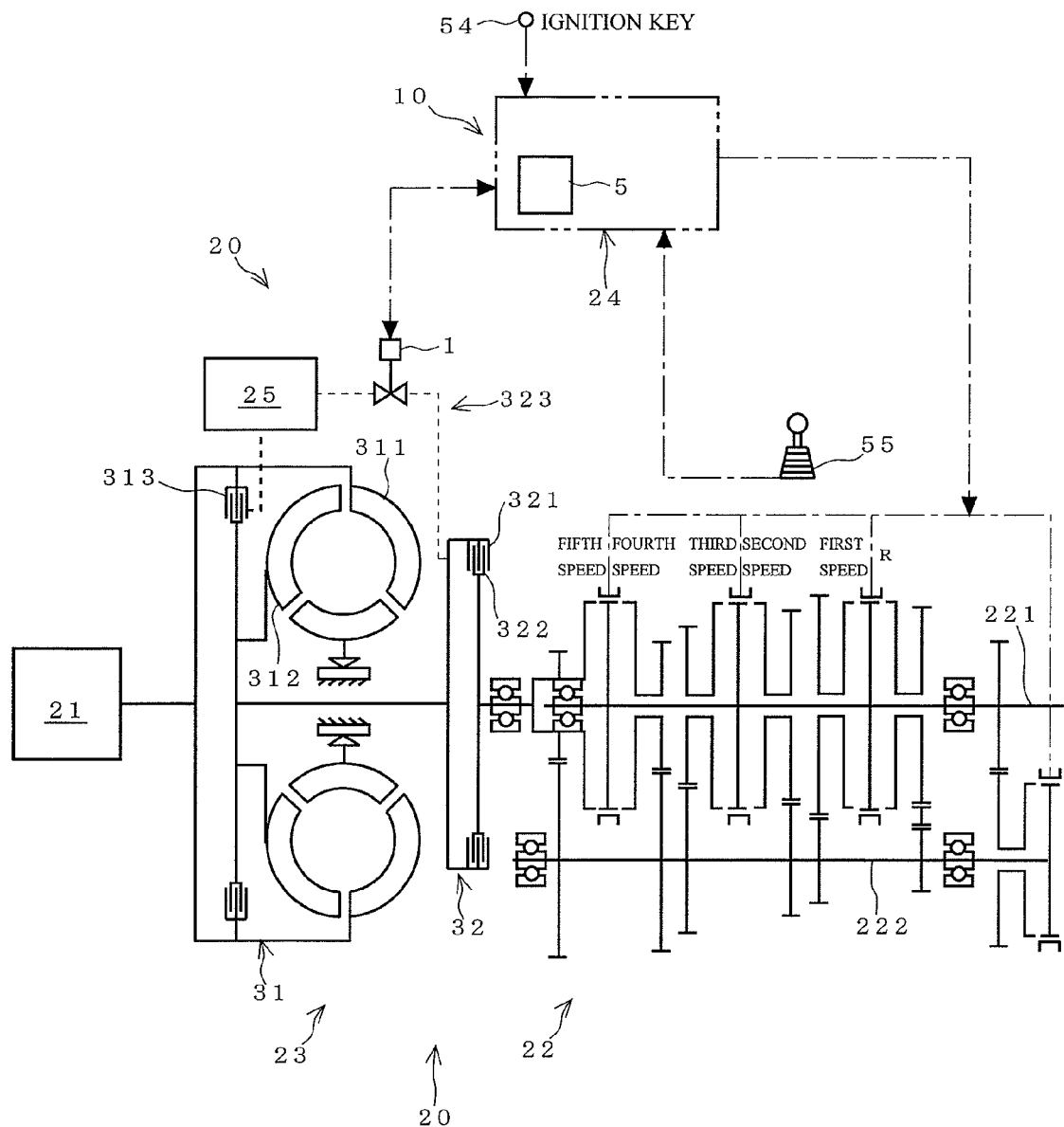
FIG. 3 shows a power transmission device of the embodiment.

A power transmission device of the present embodiment will be initially described based on FIG. 3.

As shown in FIG. 3, a power transmission device 20 transmits power of an engine 21 to a propulsion shaft (not shown in the figure) of a vehicle and includes a transmission 22 connected to the propulsion shaft, a clutch device 23 provided between the transmission 22 and the engine 21, an electronic control unit (referred to hereinbelow as ECU) 24 that controls the transmission 22 and the clutch device 23, and a fluid pressure supply device 25 (for example, a pump driven by the engine 21) for supplying a fluid pressure (oil pressure in the present embodiment) to the clutch device 23.

The transmission 22 is, for example, a multistage transmission of a full-time meshing system having a main shaft 221 and a countershaft 222. The transmission 22 is connected to the ECU 24 and shifting is controlled based on control signals from the ECU 24.

The clutch device 23 is configured by a fluid coupling 31 and a transmission clutch 32 that are connected directly to each other. In the example shown in the figure, the fluid coupling 31 is disposed on the engine side, and the transmission clutch 32 is disposed on the transmission side.

The fluid coupling 31 is provided with a pump unit 311 connected to an output shaft of the engine 21 and a turbine unit 312 connected to a drive plate 321 of the below-described transmission clutch 32, and the rotation of the pump unit 311 is transmitted to the turbine unit 312 via a fluid. In the fluid coupling 31, a lockup clutch 313 is provided for directly joining and integrally rotating the pump unit 311 and the turbine unit 312, and the lockup clutch 313 is connection-disconnection operated by a fluid pressure from the fluid pressure supply device 25.

The power of the engine 21 is transmitted via the fluid coupling 31 to the transmission clutch 32, which transmits the power to the transmission 22. The transmission clutch 32 is connected and disconnected when the transmission 22 is shifted.

The transmission clutch 32 of the present embodiment can be considered as a friction clutch operated by a fluid pressure. In the example shown in the figure, the transmission clutch is a wet multiplate clutch.

More specifically, the transmission clutch 32 has a plurality of drive plates 321 connected to the fluid coupling side, a plurality of driven plates 322 connected to the transmission side, and a clutch actuator 323 for connection-disconnection driving the drive plates 321 and driven plates 322.

The clutch actuator 323 has a spring (not shown in the figure) that biases the drive plates 321 in the direction of withdrawing from the driven plates 322 (disconnection direction of the transmission clutch 32), a fluid pressure cylinder (not shown in the figure) that drives the drive plates 321 in the direction of approaching the driven plates 322 (connection direction of the transmission clutch 32), and a linear solenoid valve (proportional solenoid valve) 1 serving as a fluid pressure regulating valve for regulating the fluid pressure (flow rate) supplied to the fluid pressure cylinder.

The linear solenoid valve 1 is provided in a channel from the fluid pressure supply device 25 to the fluid pressure cylinder and is configured so that the valve opening degree changes proportionally to the supplied electric current. More specifically, the linear solenoid valve 1 is a normally open valve, the valve opening degree decreases as the supplied electric current increases, causing the drive plates 321 of the transmission clutch 32 to be withdrawn from the driven plates 322.

Figure 1:
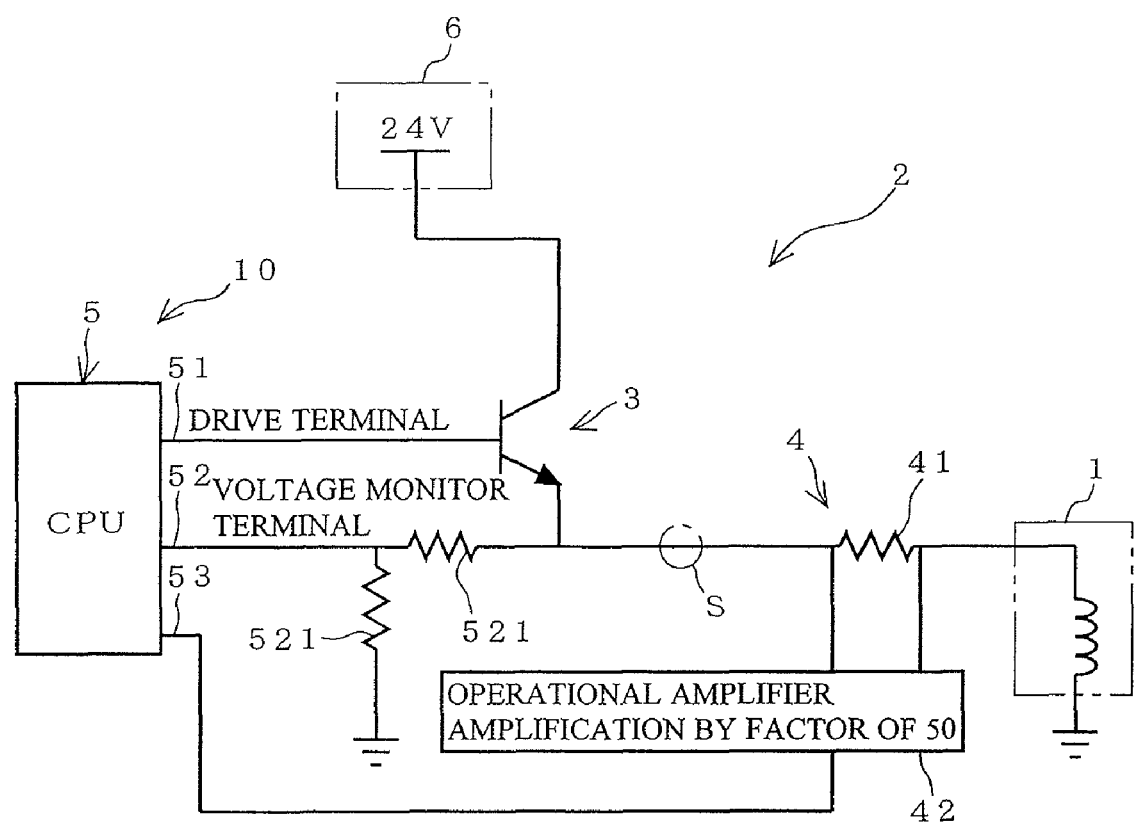
FIG. 1 is a configuration diagram of a diagnostic apparatus of an embodiment of the invention.

A drive circuit 2 for controlling the valve opening degree of the linear solenoid valve 1 is provided for the vehicle (see FIG. 1).

As shown in FIG. 1, the drive circuit 2 is configured by switching means 3 for supplying an electric current to the linear solenoid valve 1 on the basis of the inputted ON-OFF signal and variably adjusting the valve opening degree, current detection means 4 for detecting the electric current flowing from the switching means 3 to the linear solenoid valve 1, control means (referred to hereinbelow as CPU) 5 for outputting an ON-OFF signal to the switching means 3 so that the linear solenoid valve 1 has a target opening degree on the basis of a detected current value from the current detection means 4, and a battery 6 (a 24 V battery in the example shown in the figure) of the vehicle that serves as a power source.

In the present embodiment, the switching means 3 and the CPU 5 constitute part of the inner circuit of the ECU 24. Furthermore, the CPU 5 serves as shifting control means and shifts the transmission 22 to a target gear stage calculated thereby on the basis of a target gear stage selected by a shift lever operation or by an accelerator opening degree and vehicle speed.

As shown in FIG. 1, the switching means 3 is disposed between the battery 6 and the linear solenoid valve 1 and connected to the CPU 5. The switching means 3 electrically connects the battery 6 and the linear solenoid valve 1 when an ON signal is inputted from the CPU 5 (when a predetermined voltage is applied), and disconnects the battery 6 from the linear solenoid valve 1 when an OFF signal is inputted (no voltage is applied).

The current detection means 4 is configured by a shunt resistor 41 disposed between the switching means 3 and the linear solenoid valve 1, an operational amplifier 42 that amplifies (amplification by a factor of 50 in the example shown in the figure) a differential voltage of both ends of the shunt resistor 41, and by the CPU 5 serving as current computation means for computing a current value actually supplied to the linear solenoid valve 1 on the basis of the differential value amplified by the operational amplifier 42 and the resistance value of the shunt resistor 41. The resistance value of the shunt resistor 41 is set to be much smaller than the resistance value of the linear solenoid valve 1.

The CPU 5 includes a drive terminal 51 connected to the input side of the switching means 3, a voltage monitor terminal 52 connected to the output side of the switching means 3, and a current monitor terminal 53 connected to the output side of the operational amplifier 42.

As shown in FIG. 3, the CPU 5 is connected to operation means such as an ignition key 54 and shift lever 55 and inputs detection signals from these operation means.

The power transmission device 20 of the present embodiment is provided with a diagnostic apparatus 10 for performing diagnostics of a ground short of the above-described drive circuit 2 and linear solenoid valve 1.

The diagnostic apparatus 10 is provided with ground short detection means for detecting the switching of ON-OFF signals inputted to the switching means 3 and determining a ground short fault when the number of ON-OFF switching cycles per a predetermined time is equal to or less than a predetermined number. In the present embodiment, The CPU 5 serves as the ground short detection means. The ON-OFF switching may be either from ON to OFF or from OFF to ON.

The CPU 5 counts the number of times the ground short fault has been determined and prohibits shifting of the transmission 22 when the counted accumulated number of times is equal to or greater than the predetermined accumulated number of times. Furthermore, an alarm device (a lamp or a buzzer) for notifying the driver about the ground short fault when the CPU 5 prohibits shifting is connected to the CPU 5 of the present embodiment.

When the engine is stopped by the ignition key 54, the CPU 5 sets the accumulated number of times to 0 and cancels the shifting prohibition of the transmission 22.

The operation of the diagnostic apparatus 10 of the present embodiment will be described below with reference to FIG. 1 and FIG. 2.

First, the disconnection operation of the transmission clutch 32 by the drive circuit 2 in a normal mode (when there is no ground short) will be explained.

The disconnection operation of the transmission clutch 32 is performed before the gears of the transmission 22 are unmeshed, for example, when the gear stage of the transmission 22 is changed by the operation of the shift lever 55.

When a shift instruction produced by the operation of the shift lever 55 is inputted in the ECU 24, the CPU 5 is instructed to disconnect completely the transmission clutch 32.

The CPU 5, instructed to perform complete disconnection, finds a target opening degree of the linear solenoid valve 1 corresponding to the complete disconnection and finds a target current (0.8 A in the present embodiment) that has to be supplied to the linear solenoid valve 1 on the basis of the target opening degree.

For example, a configuration can be considered in which a relationship between a clutch position (connection-disconnection position) of the transmission clutch 32 and a target electric current of the linear solenoid valve 1 is found in advance and stored as a map in storage means of the ECU 24, and the CPU 5 finds the target current by referring to the map.

The CPU 5 that has found the target current value of 0.8 A then performs an ON-OFF control of the switching means 3 so that the detected current value computed from the input of the current monitor terminal 53 coincides with the target current value 0.8 A.

More specifically, the CPU 5 performs an OFF drive (outputs an OFF signal) of the switching means 3 when the detected current value exceeds the target current value and performs an ON drive (outputs an ON signal) when the detected current value is equal to or less than the target current value.

In a normal state, the CPU 5 rapidly (within a short period) repeats the ON drive and OFF drive so as to maintain the current value supplied to the linear solenoid valve 1 at a target current value of 0.8 A.

The operation of the diagnostic apparatus 10 performed when a ground short fault occurs will be explained below.

The diagnostic apparatus 10 of the present embodiment finds how many times the CPU 5 has performed ON/OFF switching of the drive terminal 51 within a predetermined interval and detects a fault of the drive circuit 2 when substantially no switching has been performed (fixed output).

For example, it is assumed that a ground short has occurred in a wiring leading from the switching means 3 to the current detection means 4 (the occurrence location is denoted by symbol S in FIG. 1).

When the CPU 5 is instructed to perform complete disconnection of the clutch during such a ground short circuit, the CPU 5 starts the ON-OFF drive of the switching means 3 so as to match the detected current value from the current detection means 4 with the target current value of 0.8 A, as described herein above.

However, because the wiring is ground short circuited, the detected current value from the current detection means 4 is below the target current value of 0.8 A at all times, regardless of the fact that the CPU 5 performs ON driving of the switching means 3.

As a result, the CPU 5 that tries to bring the detected current value close to the target current value of 0.8 A has a continuous ON drive of the switching means 3.

Thus, when there is a ground short, the CPU 5 does not perform switching of ON-OFF signals.

Accordingly, the ground short detection means (CPU 5) determines a ground short fault when the number of switching cycles of the ON-OFF signals inputted from the drive circuit 51 to the switching means 3 is equal to or less than a predetermined number of cycles (three cycles in the example shown in the figure) per a predetermined interval (10 ms in the example shown in the figure).

The explanation herein is conducted with respect to a case in which the CPU 5 is instructed to perform complete disconnection of the transmission clutch 32, but a ground short can be also diagnosed when the linear solenoid valve 1 is in an energized state.

It follows from the above, that a ground short fault (failure) can be also detected in the drive circuit 2 of the linear solenoid valve 1 in the drive state of the linear solenoid valve 1 in the same manner as in the case when a monitor circuit (voltage monitor terminal) of a conventional ON/OFF valve (duty valve) is used.

In other words, a ground short fault can be detected during normal operation (of the transmission clutch), without performing a maintenance operation such as attaching separately a detection device to the drive circuit 2 for detecting a ground short fault.

An example of diagnostic flow in which the diagnostic apparatus 10 of the present embodiment is applied to the transmission clutch 32 will be explained below with reference to FIG. 2.

Figure 2:
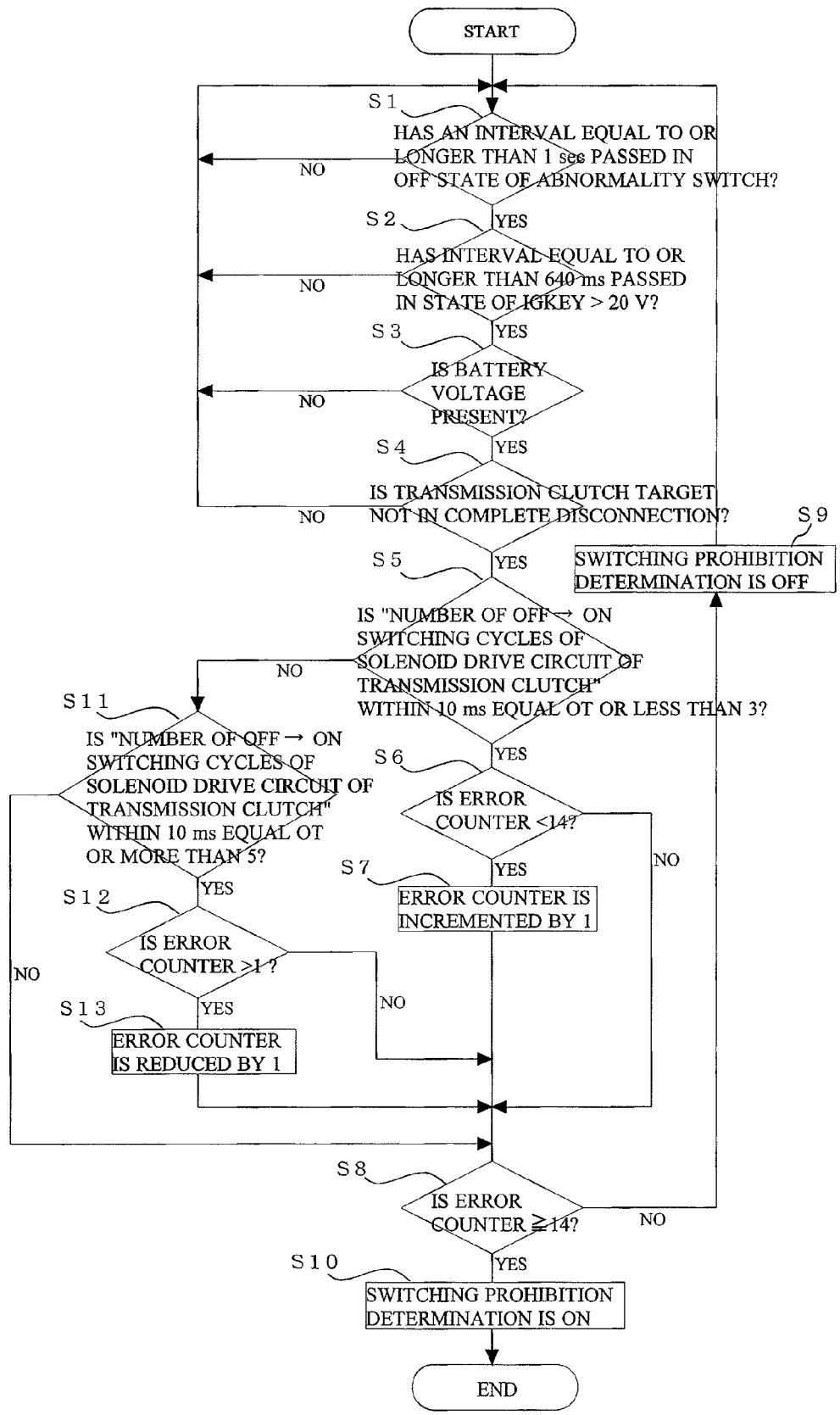
FIG. 2 is an example of a diagnostic flow in the diagnostic apparatus of the embodiment.

The diagnostic flow shown in FIG. 2 is executed by the CPU 5 and starts, for example, from the start of the engine 21.

In step S1 to step S3, the CPU 5 determines that there is no fault of a function necessary to connect and disconnect the transmission clutch 32. More specifically, the CPU 5 checks whether the following condition 1 to condition 3 are fulfilled.

Condition 1: an interval equal to or longer than 1 sec has passed in an OFF state of an abnormality switch (step S1).

Condition 2: an interval equal to or longer than 640 ms has passed in a state of ignition key >20 V (step S2).

Condition 3: a voltage of the battery 6 is equal to or higher than a predetermined voltage (a battery voltage monitor is ON; step S3).

Then, in step S4, the CPU 5 determines whether the linear solenoid valve 1 is energized.

In the present embodiment, when the transmission clutch 32 is completely connected, the target current value is set to 0 A and the linear solenoid valve 1 is not energized. In cases other than the complete connection of the transmission clutch, the linear solenoid valve 1 is energized.

Accordingly, in step S4, the CPU 5 determines whether the transmission clutch target is completely connected.

When the transmission clutch target is determined in step S4 not to be completely connected, the CPU 5 performs the above-described diagnostic of a ground short fault in step S5.

In step S5, the CPU 5 of the present embodiment finds the number of switching cycles in which the ON-OFF signals outputted from the drive terminal 51 (a transmission clutch solenoid drive circuit in FIG. 2) are switched from OFF to ON within 10 ms and determines a ground short fault when the number of switching cycles is equal to or fewer than 3.

When a ground short fault is determined in step S5, the CPU 5 checks in step S6 that the error counter has not overflowed and then increments the error counter in step S7 (adds 1 to the error counter).

With this step S7, the CPU 5 counts the number of times the ground short fault has been determined and holds the counted accumulated number of times as an error count value. The error counted is cleared (set to 0), as will be described hereinbelow, when the engine 21 is stopped by the ignition key 54.

Then, in step S8, the CPU 5 determines whether the error count (accumulated number of times) is equal to or higher than a predetermined accumulated number of times (14 in the example shown in the figure), and when the error count is equal to or higher than the predetermined accumulated number of times, the CPU 5 in step S9 prohibits shifting of the transmission 22. In the example shown in the figure, the CPU 5 prohibits shifting by setting ON in a shifting prohibition determination (variable). In the present embodiment, both the manual shifting of the shift lever 55 by the driver and the automatic shifting by the CPU 5 are prohibited.

When the error count is fewer than the predetermined accumulated number of times in step S8, the CPU 5 sets OFF in a shifting prohibition determination (variable) in step S10, performs a setting such as to allow shifting of the transmission 22, and then returns to step S1.

Thus, in the present embodiment, when the linear solenoid valve 1 of the transmission clutch 32 is ground short circuited and the transmission clutch 32 cannot be disconnected, shifting of the transmission 22 is prohibited, thereby making it possible to protect the transmission 22.

Furthermore, in the present embodiment, when a predetermined regression condition is fulfilled, the accumulated number of times (error count value) the ground short fault has been counted by the CPU 5 is reduced.

The regression condition of the present embodiment is that the number of times the ON-OFF signal outputted from the drive circuit 2 within 10 ms is switched from OFF to ON is equal to or greater than a predetermined regression number (5 in the example shown in the figure).

More specifically, when a ground short fault is determined in step S5 to be absent, the CPU 5 determines in step S11 whether the number of switching cycles found in step S5 is equal to or greater than 5.

When the number of switching cycles is equal to or greater than 5 in step S11 (when the predetermined regression condition is fulfilled), the CPU 5 checks in step S12 whether the number of times the ground short fault was determined to be present has accumulated and decrements the error counter in step S13 (subtracts 1 from the error counter) when the aforementioned number has accumulated.

Where the number of switching cycles is not equal to or greater than 5 in step S11 (that is, the number of switching cycles is 4), the CPU 5 maintains the error counter at the present value.

The above-described flow ends when shifting of the transmission 22 is prohibited in step S9 or when the engine 21 is stopped by the ignition key 54.

When the engine is stopped by the ignition key 54, the CPU 5 of the present embodiment sets the accumulated number of times (error counter) to 0 and cancels the shifting prohibition of the transmission 22.

Thus, with the diagnostic apparatus 10 of the present embodiment, a ground short between the linear solenoid valve 1 and the drive circuit 2 that drives the linear solenoid valve 1 can be reliably detected.

The present invention is not limited to the above-described embodiment and various modification examples and application examples thereof can be considered.

For example, in the above-described embodiment, the diagnostic apparatus 10 is applied to the linear solenoid valve 1 of the transmission clutch 32, but such an application is not limiting, and an application to a linear solenoid valve serving as a flow rate regulating valve or a fluid pressure regulating valve of a device (for example, a lockup clutch 313) provided for a vehicle or the like and operated by a fluid pressure can be also considered. Furthermore, the fluid is not limited to oil and a variety of fluids, for example other liquids such as water and gases such as air, can be considered.

The transmission clutch of the above-described embodiment is provided between the engine and the transmission, but such a configuration is not limiting, and the transmission clutch may be, for example, that of an automatic transmission having a planetary gear mechanism.

What is claimed is:

1. A diagnostic apparatus in which a drive circuit is configured of switching means for supplying an electric current to a linear solenoid valve and variably regulating a valve opening degree on the basis of inputted ON-OFF signals, current detection means for detecting an electric current flowing from the switching means to the linear solenoid valve, and control means for calculating a target current that has to be supplied to the linear solenoid valve on the basis of a target opening degree, outputting an OFF signal to the switching means when the detected current value exceeds the target current value and outputting an ON signal to the switching means when the detected current value is equal to or less than the target current value so that the linear solenoid valve maintains the target opening degree, and which diagnoses a ground short of the drive circuit and the linear solenoid valve, the diagnostic apparatus comprising:

ground short detection means for detecting a switching of ON-OFF signals to be inputted in the switching means and determining a ground short fault when the number of ON-OFF switching cycles per a predetermined interval is equal to or less than a predetermined fixed number of cycles.

2. The diagnostic apparatus according to claim 1, wherein the linear solenoid valve is a fluid pressure regulating valve for connecting and disconnecting a transmission clutch operated by a fluid pressure, and the ground short detection means counts the number of times the ground short fault is determined and prohibits shifting of a transmission when the counted accumulated number of times is equal to or greater than a predetermined accumulated number of times.

3. The diagnostic apparatus according to claim 2, wherein the ground short detection means sets the accumulated number of times to 0 when an engine is stopped by an ignition key and cancels the shift prohibition of the transmission.

* * * * *